Patented Oct. 13, 1925.

1,557,540

UNITED STATES PATENT OFFICE.

VÁCLAV HORÁK, OF VINOHRADY, PRAGUE, CZECHOSLOVAKIA.

PROCESS OF MANUFACTURING RESISTANT GLASS.

No Drawing.   Application filed January 22, 1923. Serial No. 614,297.

*To all whom it may concern:*

Be it known that I, VÁCLAV HORÁK, citizen of Czechoslovakia, residing at 30 Luzicka Vinohrady, Prague, Czechoslovakia, have invented certain new and useful Improvements in Processes of Manufacturing Resistant Glass, of which the following is a specification.

It is known that glass is obtained by submitting to a temperature of 900 to 1400° centigrade a silicious sand to which an alkaline carbonate and lime are added. Lime may be replaced by oxides of lead, magnesium, barium, aluminum (for instance in the form of kaolin), arsenic and other metal oxides.

The resulting products are very fragile or brittle, and have but weak resistance to acids and alkalies.

In the manufacture of certain special glasses part of the silicic acid of the sand can be replaced by boric acid while reducing the quantity of alkalies.

Such products have somewhat greater resistance to acids and alkalies than the above mentioned glasses, but their resistance is not as great as the present requirements of laboratories would necessitate. Moreover, although the sudden fall of temperature that a boro-silicate glass can support without breaking is greater than that of ordinary glasses, it does not exceed 220° centigrade.

Under the denomination of glass have been also ranked products made of pure quartz, which, resulting from the melting thereof, present qualities of thermal resistance and non-corrosion by acids, which are greater than those of glasses obtained by means of silicious sand. However such products, just as glasses with a basis of sand, have but weak resistance to shock.

As pure quartz has very high melting point which is too near its evaporating point, the idea arose—in order to economize labor and reduce evaporation—to add oxides having acid function and high melting point, such as oxides of titanium, zirconium, thorium, earthy metals, and in particular aluminum and metals of rare earths.

In accordance with said process the evaporation of quartz is reduced; but to obtain melting it is still necessary to have a temperature of 1700° to 1800° centigrade. Moreover, even at such a temperature, quartz does not become as liquid as a composition having a basis of silicious sand; it keeps pasty form, which causes great difficulties in blowing and requires special workmen who have to work the bulk of glass in a muffle furnace.

The present invention has for its object a process of manufacturing a very resistant glass which on the one hand is obtained just as easily as a glass with basis of silicious sand, and on the other hand possesses physical and chemical qualities superior to products of fusion of quartz.

The process consists in submitting, in a furnace to a temperature of about 1200° centigrade, a mixture of sand, boric acid, carbonate of potash, carbonate of soda, kaolin, mica, zirconic and titanic oxides.

The proportions of materials in this composition may vary within considerable limits without the products that result therefrom differing substantially in their characteristic properties. The most usually employed proportions may be summarized as follows:

| | Per cent. |
|---|---|
| Sand (Hohenbocka mark) | 60 to 70 |
| Anhydrous boric acid | 15 to 30 |
| Potassium carbonate | 1 to 2 |
| Sodium carbonate | 3 to 6 |
| Kaolin (hydrated silicate of aluminum | 2 to 6 |
| Mica (muscovite) | 1 to 4 |
| Zirconic acid | 1 to 3 |
| Titanic acid | 1 to 3 |

By way of example, the composition by weight of a glass in accordance with the invention is as follows:

| | |
|---|---|
| Sand (Hohenbocka mark) | 91 kg. 500 |
| Boric acid | 31 kg. 760 |
| Potassium carbonate | 1 kg. 850 |
| Calcined sodium carbonate (Solvay mark) | 6 kg. 700 |
| Kaolin (very dry) | 5 kg. 600 |
| Mica (muscovite) | 3 kg. 600 |
| Zirconic oxid | 3 kg. 320 |
| Titanic oxid | 2 kg. 590 |

The proportions of the efficacious oxides in this composition are as folows:

| | Per cent. |
|---|---|
| $SiO_2$ | 66.38 |
| $B_2O_3$ | 22.85 |
| $K_2O$ | 1.61 |
| $Na_2O$ | 2.70 |
| $Al_2O_3$ | 2.35 |
| $ZrO_2$ | 2.31 |
| $TiO_2$ | 1.80 |
| | 100.00 |

These materials finely ground and mixed are heated in an ordinary furnace, the mixture melts at a temperature of about 1200° centigrade, and the melted bulk is blown or moulded as easily as ordinary glass.

Analysis of this glass has given this formula:

| | Per cent. |
|---|---|
| $SiO_2$ | 65.05 |
| $B_2O_3$ | 23.43 |
| $Na_2O$ | 2.80 |
| $K_2O$ | 2.55 |
| $Al_2O_3$ | 2.35 |
| $ZrO_2$ | 2.20 |
| $TiO_2$ | 1.62 |
| | 100.00 |

This formula supposes that the materials employed are chemically pure as can be found in commerce. For instance, Hohenbocka sand is used which contains 99.7% $SiO_2$, calcined potassium carbonate (or calcined potash) having 98% of $K_2CO_3$, calcined sodium carbonate Solvay mark having 100% of $Na_2CO_3$, very dry kaolin (hydrated silicate of alumina) muscovite in dry powder, and zirconic and titanic oxids.

The proportions given by the first formula are those most generally advantageous as to economy, transport, etc. However it should be noted that another glass having the same qualities of resistance can be obtained by mixing the eight materials in proportions different from those given in said first formula.

The cubical coefficient of expansion of glass obtained is 143 to 145 x $10^{-7}$.

The glass according to the invention has the following main properties:

1. It is very good conductor of heat.
2. It can support a sudden fall of temperature from 320° to 0° centigrade.
3. It is a very good electrical insulator.
4. It possesses greater resistance to acids and alkalies than known laboratory glasses.
5. Very great resistance to shock.
6. The melted material can be drawn and blown very easily and is particularly suitable for the manufacture of bulbs for serums.
7. It can be heated a very long time without devitrifying.
8. If a vessel is cracked owing to a blow, it will suffice to heat the crack direct on a gas burner for every trace thereof to disappear.
9. By tapping or knocking the vessel a sound is produced that distinguishes the product without difficulty from similar products.
10. Tin soldering melted in a vessel made of this glass does not adhere to the vessel after cooling and consequently can be withdrawn without the slightest difficulty.

This glass is particularly suitable for making laboratory vessels and apparatus as it does not contain barium, zinc, arsenic, antimony or any element that could mix with a solution. It is also suitable owing to the same reasons, for making cooking utensils and glassware for medical purposes.

What I claim is:

1. The method of manufacturing a resistant glass, which will support a sudden fall of temperature from 320° to 0° C. consisting in melting at about 1200° centigrade, a mixture of sand, boric acid, potassium carbonate, sodium carbonate, kaolin, muscovite, zirconic oxide and titanic oxide.

2. The method of manufacturing a resistant glass supporting a sudden fall of temperature from 320° to 0° centigrade, consisting in melting at about 1200° centigrade 60 to 70 per cent silicic acid, 15 to 30 per cent boric acid, 1 to 2 per cent potassium carbonate, 3 to 6 per cent sodium carbonate, 2 to 6 per cent kaolin, 1 to 4 per cent muscovite, 1 to 3 per cent zirconic oxide and 1 to 3 per cent titanic oxide.

3. A glass of substantially the following analysis: $SiO_2$ 65.05 per cent, $B_2O_3$ 23.43 per cent, $Na_2O$ 2.80 per cent, $K_2O$ 2.55 per cent, $Al_2O_3$ 2.35 per cent, $ZrO_2$ 2.20 per cent and $TiO_2$ 1.62 per cent.

In testimony whereof I affix my signature.

Doctor VÁCLAV HORÁK.